(12) United States Patent
Kim et al.

(10) Patent No.: US 11,438,136 B2
(45) Date of Patent: Sep. 6, 2022

(54) ENCRYPTION APPARATUS AND METHOD FOR ENCRYPTING ENCRYPTION TARGET DATA IN DATA BASED ON HOMOMORPHIC ENCRYPTION ALGORITHM

(71) Applicant: SAMSUNG SDS CO., LTD., Seoul (KR)

(72) Inventors: Eun-Kyung Kim, Seoul (KR); Hyo-Jin Yoon, Seoul (KR); Duk-Jae Moon, Seoul (KR); Min-Woo Jeong, Seoul (KR); Jung-Hoon Sohn, Seoul (KR); Young-Hyun Kim, Seoul (KR); Hun-Hee Yu, Seoul (KR); Ji-Hoon Kwon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 332 days.

(21) Appl. No.: 16/666,098

(22) Filed: Oct. 28, 2019

(65) Prior Publication Data
US 2021/0126768 A1    Apr. 29, 2021

(30) Foreign Application Priority Data
Oct. 25, 2019 (KR) .................. 10-2019-0133612

(51) Int. Cl.
*H04L 9/00* (2022.01)
*G06N 20/00* (2019.01)
*G06N 5/04* (2006.01)
*G09C 1/00* (2006.01)

(52) U.S. Cl.
CPC .............. *H04L 9/008* (2013.01); *G06N 5/04* (2013.01); *G06N 20/00* (2019.01); *G09C 1/00* (2013.01)

(58) Field of Classification Search
None
See application file for complete search history.

(56) References Cited

U.S. PATENT DOCUMENTS

| 9,252,942 B2 | 2/2016 | Zhang et al. |
| 2006/0210071 A1* | 9/2006 | Chandran ........... H04L 63/0428 380/42 |
| 2013/0275752 A1* | 10/2013 | Zhang ................... H04L 9/008 713/167 |

* cited by examiner

*Primary Examiner* — William J. Goodchild
(74) *Attorney, Agent, or Firm* — The PL Law Group, PLLC

(57) ABSTRACT

An apparatus for encryption according to an embodiment of the present disclosure comprises a classifier configured to classify each data included in an original data set into one of encryption target data and non-encryption target data on the basis of at least one of determination on whether or not an operation to be applied to each data included in the original data set for an analysis of the original data set is a preset operation and determination on whether or not each data included in the original data set is sensitive information; and an encryptor configured to encrypt the encryption target data among the data included in the original data set using a homomorphic encryption algorithm.

12 Claims, 6 Drawing Sheets

ENCRYPTION APPARATUS AND METHOD FOR ENCRYPTING ENCRYPTION TARGET DATA IN DATA BASED ON HOMOMORPHIC ENCRYPTION ALGORITHM

CROSS REFERENCE TO RELATED APPLICATIONS AND CLAIM OF PRIORITY

This application claims priority to and the benefit of Korean Patent Application No. 10-2019-0133612 filed on Oct. 25, 2019, the disclosure of which is incorporated herein by reference in its entirety.

TECHNICAL FIELD

The following description relates to an encryption technology.

BACKGROUND ART

In a conventional data privacy protection analysis using homomorphic encryption, all data is encrypted and processed with homomorphic encryption. In the case of a ciphertext, data size is increased by several thousand times compared to general data, and thus computation cost is increased when even data for which encryption is not required is encrypted and processed. To improve such a drawback, homomorphic encryption generally encrypts multiple data into a single ciphertext, and at this time, but there is a limitation in processing an operation on the entire encrypted data (single instruction multiple data (SIMD)).

SUMMARY

The disclosed embodiments are intended to provide an apparatus and method for encryption.

In one general aspect, there is provided an apparatus for encryption comprising a classifier configured to classify each data included in an original data set into one of encryption target data and non-encryption target data on the basis of at least one of determination on whether or not an operation to be applied to each data included in the original data set for an analysis of the original data set is a preset operation and determination on whether or not each data included in the original data set is sensitive information; and an encryptor configured to encrypt the encryption target data among the data included in the original data set using a homomorphic encryption algorithm.

The classifier may be further configured to classify data that corresponds to the sensitive information among the data included in the original data set as the encryption target data.

The classifier may be further configured to classify data to which the preset operation is to be applied among the data included in the original data set as the encryption target data.

The classifier may be further configured to classify data that corresponds to the sensitive information or data to which the preset operation is to be applied among the data included in the original data set as the encryption target data.

The apparatus may further comprise: an analysis requester configured to provide an external device with an analysis target data set which includes data encrypted using the homomorphic encryption algorithm and data classified as the non-encryption target data among the data included in the original data set and receive a ciphertext generated through a homomorphic operation using at least one of the data included in the analysis target data set; and a decryptor configured to decrypt the received ciphertext using the homomorphic encryption algorithm.

The ciphertext may be generated using at least one of a homomorphic operation using the encrypted data among the data included in the analysis target data set and a homomorphic operation using the encrypted data and unencrypted data among the data included in the analysis target data set.

In another general aspect, there is provided a method of encryption comprising classifying each data included in an original data set into one of encryption target data and non-encryption target data on the basis of at least one of determination on whether or not an operation to be applied to each data included in the original data set for an analysis of the original data set is a preset operation and determination on whether or not each data included in the original data set is sensitive information, and encrypting the encryption target data among the data included in the original data set using a homomorphic encryption algorithm.

The classifying of each data may include classifying data that corresponds to the sensitive information among the data included in the original data set as the encryption target data.

The classifying of each data may include classifying data to which the preset operation is to be applied among the data included in the original data set as the encryption target data.

The classifying of each data may include classifying data that corresponds to the sensitive information or data to which the preset operation is to be applied among the data included in the original data set as the encryption target data.

The method may further comprise providing an external device with an analysis target data set which includes data encrypted using the homomorphic encryption algorithm and data classified as the non-encryption target data among the data included in the original data set, receiving a ciphertext generated through a homomorphic operation using at least one of the data included in the analysis target data set, and decrypting the received ciphertext using the homomorphic encryption algorithm.

The ciphertext may be generated using at least one of a homomorphic operation using the encrypted data among the data included in the analysis target data set and a homomorphic operation using the encrypted data and unencrypted data among the data included in the analysis target data set.

According to the embodiments of the present disclosure, encryption is performed on some data included in a data set using a homomorphic encryption algorithm and encrypted and unencrypted data are used for an analysis, so that confidentiality of sensitive data can be maintained and the amount of data transfer required for analysis and computation time and cost required for analysis can be reduced.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
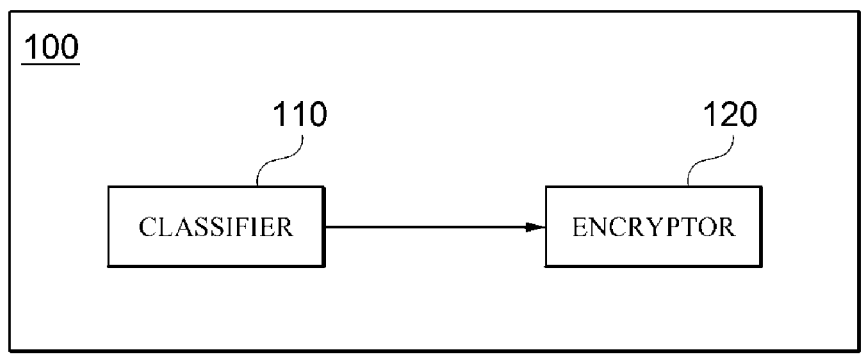
FIG. 1 is a diagram illustrating a configuration of an apparatus for encryption according to one embodiment of the present disclosure.

FIG. 1 is a diagram illustrating a configuration of an apparatus for encryption according to one embodiment of the present disclosure.

Referring to FIG. 1, an apparatus 100 for encryption according to one embodiment of the present disclosure includes a classifier 110 and an encryptor 120.

The classifier 110 classifies each data included in an original data set into one of encryption target data and non-encryption target data based on at least one of determination on whether or not an operation to be applied to each data included in the original data set for an analysis of the original data set is a preset operation and determination on whether or not each data included in the original data set is sensitive information.

In this case, the original data set refers to a set of unencrypted data, and each data included in the original data set is not necessarily limited to a specific type or a specific form of data.

The sensitive information may be various types of information that are prohibited from disclosure to unauthorized third parties by law, such as name, age, account password, account number, and the like, or are required to be closed for the sake of personal privacy protection or security.

In one embodiment, the classifier 110 may determine data that corresponds to the sensitive information on the basis of a category pre-allocated to each data included in the original data set. For example, when it is assumed that, as shown in an example of FIG. 2, the original data set includes data that corresponds to one of categories including "name," "ID," "loan effective date," "amount of loan," and "branch where loan is approved" and categories "name," and "ID" are preset as sensitive information of a user, the classifier 110 may determine that data 210 included in the categories "name," and "ID," among data included in the original data set 200, as data that corresponds to sensitive information.

According to another embodiment, the classifier 110 may determine whether each data included in the original data set corresponds to sensitive information using a classification model pre-trained through machine learning to classify data corresponding to sensitive information.

Meanwhile, a method of determining data corresponding to sensitive information may be performed in various ways in addition to the above-described example, and is not necessarily limited to a particular method.

According to one embodiment, the "preset operation" may be an operation capable of efficient homomorphic operation. In this case, the homomorphic operation for a specific operation may refer to an operation capable of generating a ciphertext for a result of performing the specific operation on a plaintext data of encrypted data by computing the encrypted data without decryption.

In a specific example, the "preset operation" may be an operation that does not require too much time or computing resources for homomorphic operations, such as an addition operation, a multiplication operation, a subtraction operation, and a polynomial operation consisting of combinations of one or more thereof.

The "preset operation" may be preset by the user in consideration of a computing resource available in an environment where the homomorphic operation is to be performed, a homomorphic encryption algorithms used for encryption, and the like.

According to one embodiment, the classifier 110 may classify the data that corresponds to the sensitive information among the data included in the original data set as encryption target data and classify the remaining data as non-encryption target data.

According to another embodiment, the classifier 110 may classify data to which the preset operation is to be applied among the data included in the original data set as encryption target data and classify the remaining data as non-encryption target data.

According to still another embodiment, the classifier 110 may classify data that corresponds to the sensitive information or to which the preset operation is to be applied among the data included in the original data set as encryption target data and classify the remaining data as non-encryption target data.

Figure 2:
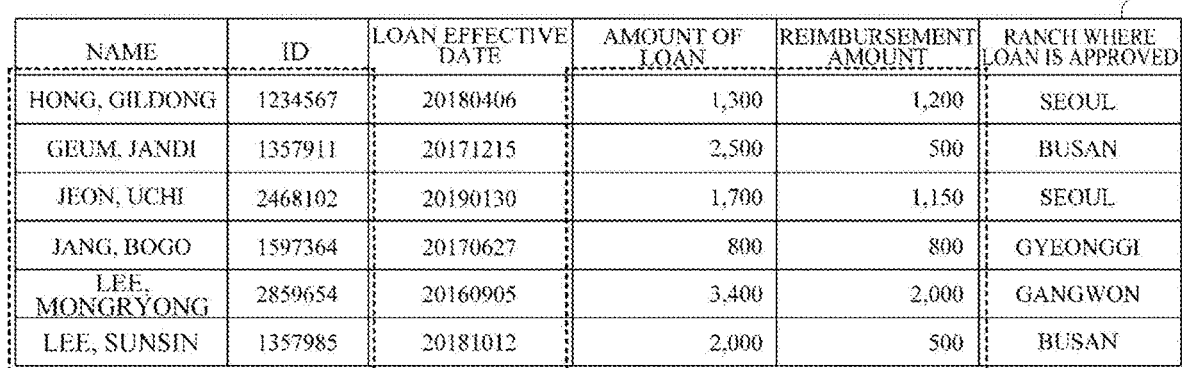
FIG. 2 is a diagram illustrating an example of an original data set.

In a specific example, it is assumed that an analysis to be performed on the original data set 200 shown in FIG. 2 is a "calculation of the balance of loan borrowed by a user in 2017," the data 210 belonging to "name" and "ID" categories are the sensitive information, and the preset operations are addition, subtraction, and multiplication.

In this case, for an analysis, a comparison operation according to Equation 1 below is to be performed on each data A belonging to "loan effective date" among the data included in the original data set 200 and a subtraction operation according to Equation 2 below is to be performed on each data X belongs to "amount of loan" and each data Y belonging to "reimbursement amount" category.

$$20170101 \leq A \leq 20171231 \qquad \text{[Equation 1]}$$

$$\text{Balance of loan} = X - Y \qquad \text{[Equation 2]}$$

In this case, the classifier 110 may classify the data 210 that correspond to the sensitive information as encryption target data and classify the remaining data as non-encryption data.

In another example, the classifier 110 may classify data 220 to which subtraction, which is one of the preset operations, is to be applied as classification target data and classify the remaining data as non-encryption target data.

In still another example, the classifier 110 may classify the data 210 that corresponds to the sensitive information and the data 220 to which the preset operation is to be applied as encryption target data and classify the remaining data as non-encryption target data.

Referring back to FIG. 1, the encryptor 120 may encrypt the data classified as encryption target data among the data included in the original data set using a homomorphic encryption algorithm.

In this case, according to one embodiment, as the homomorphic encryption algorithm for encryption, various forms of homomorphic encryption algorithms that support homomorphic operations between encrypted data and homomorphic operations between encrypted data and unencrypted data may be used, and the homomorphic encryption algorithm is not necessarily limited to a specific homomorphic encryption algorithm.

Figure 3:
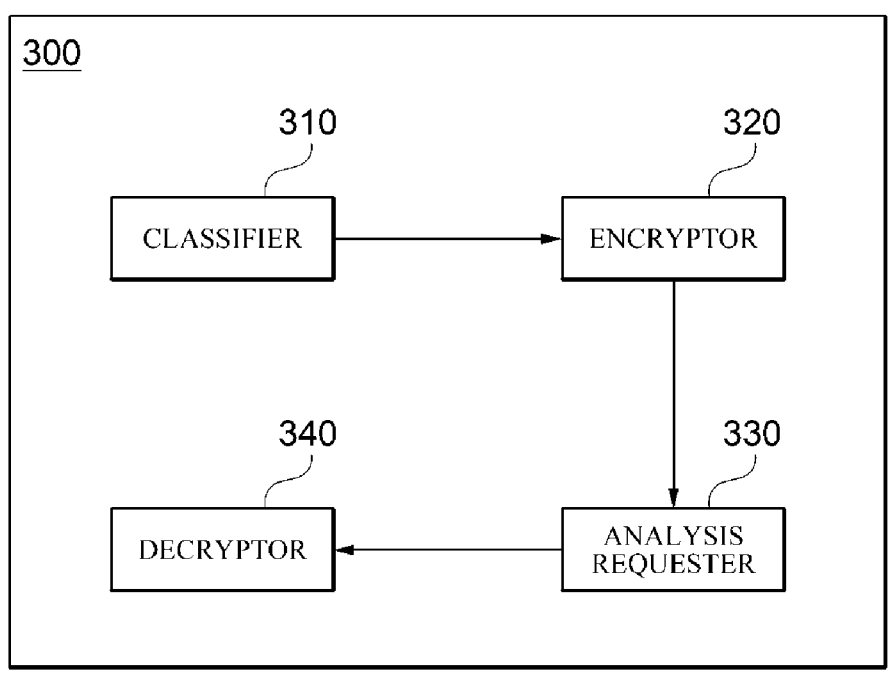
FIG. 3 is a diagram illustrating a configuration of an apparatus for encryption according to an additional embodiment.

FIG. 3 is a diagram illustrating a configuration of an apparatus for encryption according to an additional embodiment.

Referring to FIG. 3, an apparatus 300 for encryption according to an additional embodiment includes a classifier 310, an encryptor 320, an analysis requester 330, and a decryptor 340.

In the example shown in FIG. 3, the classifier 310 and the encryptor 320 are the same configurations as the classifier 110 and the encryptor 120 shown in FIG. 1, and thus detailed description thereof will not be reiterated.

The analysis requester 330 provides an external device (not shown) with an analysis target data set that includes data encrypted by the encryptor 320 and data classified as non-encryption target data among data included in an original data set, and receives a ciphertext generated through a homomorphic operation using at least one of the data included in the analysis target data set from the external device.

Here, the external device may be a device operated by, for example, an external business provider that provides a data analysis service, but an operator of the external device may vary according to embodiments.

According to one embodiment, the homomorphic operation performed by the external device may include at least one of a homomorphic operation using the encrypted data among the data included in the analysis target data set and a homomorphic operation using the encrypted data and unencrypted data among the data included in the analysis target data set.

When the ciphertext is received from the external device, the decryptor 340 decrypts the received ciphertext using a homomorphic encryption algorithm.

Hereinafter, an illustrative homomorphic encryption algorithm applicable to the above-described embodiments will be described. Specifically, the illustrative homomorphic encryption algorithm may be composed of a key generation algorithm, an encryption algorithm, a decryption algorithm, and a homomorphic operation algorithm shown below.

Key Generation Algorithm When a message space for encryption is defined as a polynomial ring $R=Z[X]/(X^N+1)$ and a ciphertext space for a message is defined as a quotient ring $R_q:=R/qR$ for integers q, the illustrative key generation algorithm selects elements a, b, and e of R to generate a secret key $sk=(1, s)\in R^2$, a public key $pk=(b, a):=(-as+e, a)\in R_q^2$, and an evaluation key $evk=(b', a'):=(-a's+e'+Ps^2, a')\in R_{Pq}^2$ (here, a' denotes an arbitrary element of $R_{Pq}$ and P is a sufficiently large integer).

Here, s may be an element of a small size and e may be an element of a small size with high probability. Meanwhile, when an element r of R is small, it means that a norm |r| for measuring a size on R is smaller than a predetermined bound B.

In one embodiment, the key generation algorithm may be performed by, for example, a separate trusted authority.

Encryption Algorithm and Decryption Algorithm

An encryption algorithm selects v, $e_0$, and $e_1$ (here, v is an arbitrary value of a small size as an element of R and $e_0$ and $e_1$ are arbitrary noise values of very small size with high probability as elements of R) and then generates a ciphertext c for a message $m \in R$ using v, $e_0$, $e_1$, and a public key pk, as shown in Equation 1 below.

$$c=(c_0,c_1)=v(b,a)+(m+e_0,e_1)\in R_q^2 \quad \text{[Equation 1]}$$

Here, the message m may be generated by encoding data $A=(a_1, a_2, \ldots, a_n)$, which are encryption targets, into one polynomial as shown in Equation 2 below.

$$Ecd(A) \to m(X) \quad \text{[Equation 2]}$$

Here, the order of polynomial m(X) may be a constant multiple of n.

Meanwhile, the decryption algorithm may calculate a dot product between the ciphertext c and a secret key sk as shown in Equation 3 below for decrypting the message m from the ciphertext c.

$$Dec(sk,c) \to <c,sk>:=c_0+c_1s \in R_q \quad \text{[Equation 3]}$$

Here, if $c_0+c_1s=m+e\in R_q$ holds and e is sufficiently small as compared to the message m, m+e may be considered as an approximation of m.

Meanwhile, the data A may be restored by decoding the encoded message m through a decryption algorithm as shown in Equation 4 below.

$$Dcd(m(X)) \to A=(a_1,a_2,\ldots,a_n) \quad \text{[Equation 4]}$$

In one embodiment, the encryption algorithm and the decryption algorithm may be performed by an apparatus, such as the above-described apparatus for encryption 100 or 300, which is provided with a secret key sk and a public key pk from a trusted authority.

Homomorphic Operation Algorithm

A homomorphic operation algorithm, which is used for performing a homomorphic operation, may perform a homomorphic addition operation for generating a ciphertext $c^+$ for m+m' by computing a ciphertext c of a message m and a ciphertext c' of a message m' in an encrypted state and a homomorphic multiplication operation for generating a ciphertext $c^*$ for m·m' by computing the ciphertext c of the message m and the ciphertext c' of the message m' in an encrypted state.

In addition, the homomorphic operation algorithm may use the above-described homomorphic addition and homomorphic multiplication to perform a homomorphic operation for polynomial represented as a combination of addition and multiplication.

The homomorphic operation algorithm may support a homomorphic operation between encrypted data and unencrypted data.

Specifically, an operation between a ciphertext c obtained by encrypting data $A=(a_1, a_2, \ldots, a_n)$ according to the above-described Equations 1 and 2 and unencrypted data $B=(b_1, b_2, \ldots, b_n)$ may be performed as below.

First, the homomorphic operation algorithm may generate a message m' by encoding data B as shown in Equation 5 below.

$$Ecd(B) \to m'(X) \quad \text{[Equation 5]}$$

Then, the homomorphic operation algorithm may generate a ciphertext $c^{A+B}$ for A+B and a ciphertext $c^{A\times B}$ for A×B through an operation between c and m' as shown in Equations 6 and 7.

$$c^{A+B} := c + (m',0) = v(b,a) + (m,0) + (m',0) \quad \text{[Equation 6]}$$

$$c^{A\times B} := c \cdot m' = vm'(b,a) + m'(m,0) \quad \text{[Equation 7]}$$

Meanwhile, in one embodiment, the homomorphic operation algorithm may be performed by an external device that is provided with an analysis target data set from the apparatus 100 or 300 for encryption.

Meanwhile, when the apparatus 100 or 300 for encryption receives each of the ciphertexts $c^{A+B}$ and $c^{A\times B}$, the apparatus 100 or 300 may generate m+m' and m·m' using the decryption algorithm as shown in Equations 8 and 9 and may acquire A+B and A×B by decoding m+m' and m·m'.

$$Dec(sk, c^{A+B}) \to <c^{A+B}, sk> = <c, sk> + <(m',0), sk> = (m+e) + m' \approx m + m' \quad \text{[Equation 8]}$$

$$Dec(sk, c^{A\times B}) \to <c^{A\times B}, sk> = <m' \cdot c, sk> = m' \cdot <c, sk> = m' \cdot (m+e) \approx m \cdot m' \quad \text{[Equation 9]}$$

Figure 4:
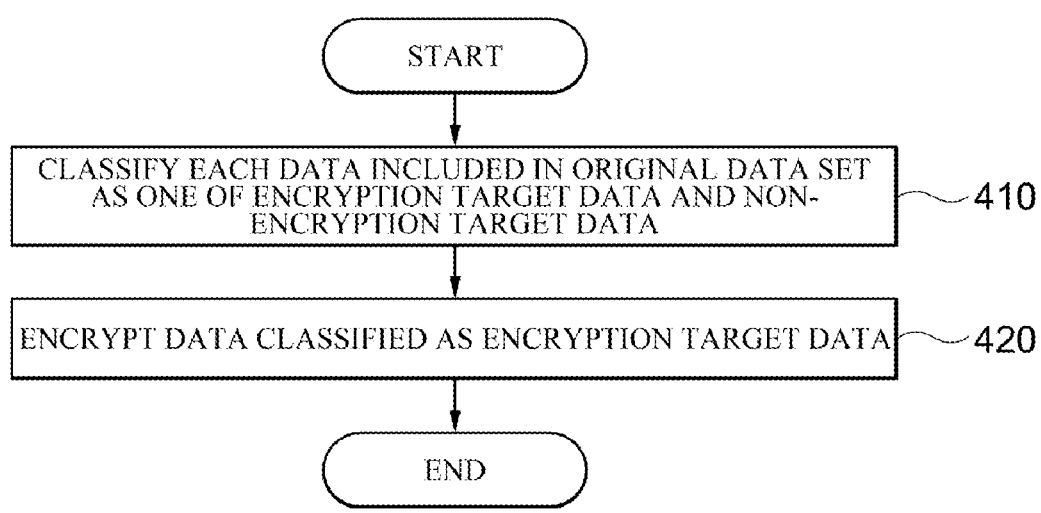
FIG. 4 is a flowchart illustrating a method of encryption according to one embodiment.

FIG. 4 is a flowchart illustrating a method of encryption according to one embodiment.

The method shown in FIG. 4 may be performed by the apparatus 100 for encryption shown in FIG. 1.

Referring to FIG. 4, the apparatus 100 for encryption classifies each data included in an original data set into one of encryption target data and non-encryption target data based on at least one of determination on whether or not an operation to be applied to each data included in the original data set for an analysis of the original data set is a preset operation and determination on whether or not each data included in the original data set is sensitive information (410).

In this case, according to one embodiment, the apparatus 100 for encryption may classify the data that corresponds to the sensitive information among the data included in the original data set as encryption target data.

According to another embodiment, the apparatus 100 for encryption may classify data to which the preset operation is to be applied among the data included in the original data set as encryption target data According to still another embodiment, the apparatus 100 for encryption may classify data that corresponds to the sensitive information or to which the preset operation is to be applied among the data included in the original data set as encryption target data.

Then, the apparatus 100 for encryption encrypts the data classified as encryption target data among the data included in the original data set using a homomorphic encryption algorithm (420).

Meanwhile, in the flowchart illustrated in FIG. 4, at least some of the operations may be performed in different order or may be combined into fewer operations or further divided into more operations. In addition, some of the operations may be omitted, or one or more extra operations, which are not illustrated, may be added to the flowchart and be performed.

Figure 5:
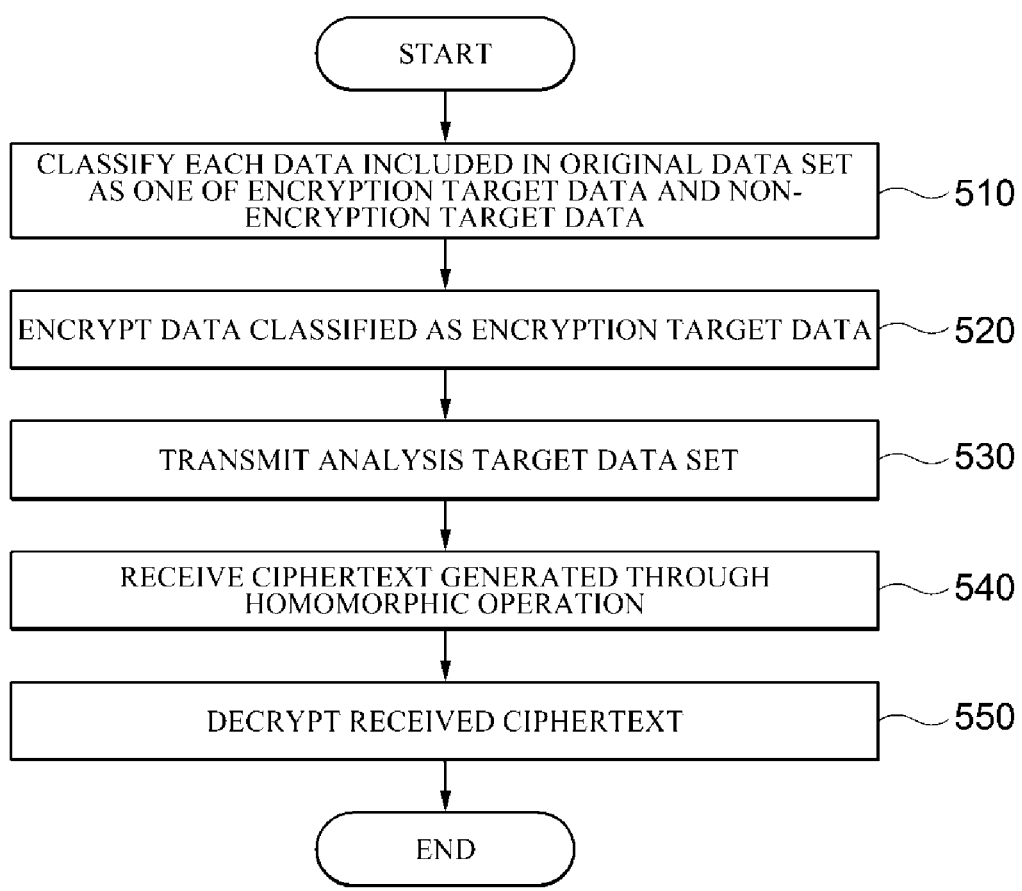
FIG. 5 is a flowchart illustrating a method of encryption according to an additional embodiment.

FIG. 5 is a flowchart illustrating a method of encryption according to an additional embodiment.

The method shown in FIG. 5 may be performed by the apparatus 300 for encryption shown in FIG. 3.

In FIG. 5, operations 510 and 520 are substantially the same as operations 410 and 420 shown in FIG. 4, and thus redundant descriptions thereof will be omitted.

Referring to FIG. 5, the apparatus 300 for encryption transmits an analysis target data set that includes data encrypted in operation 520 and data classified as non-encryption target data (i.e., unencrypted data) among data included in an original data set to an external device (530).

Then, the apparatus 300 for encryption receives a ciphertext generated through a homomorphic operation using at least one of the data included in the analysis target data set from the external device (540).

Then, the apparatus 300 for encryption decrypts the received ciphertext using a homomorphic encryption algorithm (550).

Meanwhile, in the flowchart illustrated in FIG. 5, at least some of the operations may be performed in different order or may be combined into fewer operations or further divided into more operations. In addition, some of the operations may be omitted, or one or more extra operations, which are not illustrated, may be added to the flowchart and be performed.

Figure 6:
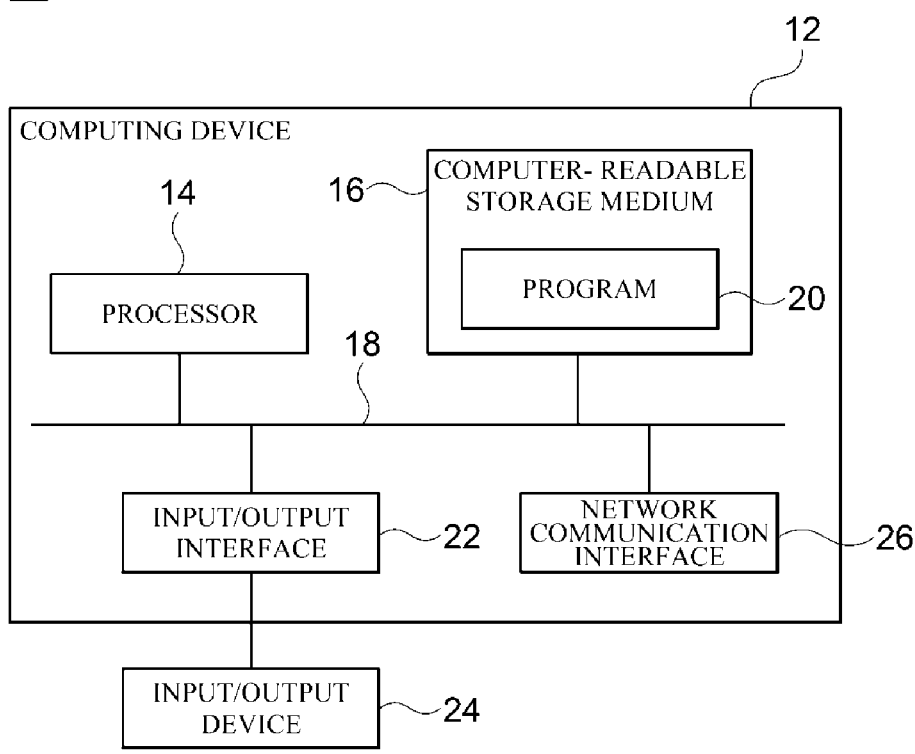
FIG. 6 is a block diagram illustrating a computing environment including a computing device suitable to be used in exemplary embodiments.

FIG. 6 is a block diagram illustrating a computing environment including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be one or more components included in the apparatuses 100 and 300 for encryption.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to an exemplary embodiment.

The computer-readable storage medium 16 is configured to store computer executable commands and program codes, program data and/or information in other suitable forms. The program 20 stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An apparatus for encryption comprising:
  a classifier configured to classify each data included in an original data set into one of encryption target data and non-encryption target data on the basis of at least one of determination on whether or not an operation to be applied to each data included in the original data set for an analysis of the original data set is a preset operation and determination on whether or not each data included in the original data set is sensitive information;
  an encryptor configured to encrypt the encryption target data among the data included in the original data set using a homomorphic encryption algorithm; and
  an analysis requester configured to provide an external device with an analysis target data set which includes data encrypted using the homomorphic encryption algorithm and data classified as the non-encryption target data among the data included in the original data set and receive a ciphertext generated through a homomorphic operation using at least one of the data included in the analysis target data set.

2. The apparatus of claim 1, wherein the classifier is further configured to classify data that corresponds to the sensitive information among the data included in the original data set as the encryption target data.

3. The apparatus of claim 1, wherein the classifier is further configured to classify data to which the preset operation is to be applied among the data included in the original data set as the encryption target data.

4. The apparatus of claim 1, wherein the classifier is further configured to classify data that corresponds to the sensitive information or data to which the preset operation is to be applied among the data included in the original data set as the encryption target data.

5. The apparatus of claim 1, further comprising:
  a decryptor configured to decrypt the received ciphertext using the homomorphic encryption algorithm.

6. The apparatus of claim 1, wherein the ciphertext is generated using at least one of a homomorphic operation using the encrypted data among the data included in the analysis target data set and a homomorphic operation using the encrypted data and unencrypted data among the data included in the analysis target data set.

7. A method of encryption comprising:
  classifying each data included in an original data set into one of encryption target data and non-encryption target data on the basis of at least one of determination on whether or not an operation to be applied to each data included in the original data set for an analysis of the original data set is a preset operation and determination on whether or not each data included in the original data set is sensitive information;
  encrypting the encryption target data among the data included in the original data set using a homomorphic encryption algorithm;
  providing an external device with an analysis target data set which includes data encrypted using the homomorphic encryption algorithm and data classified as the non-encryption target data among the data included in the original data set; and
  receiving a ciphertext generated through a homomorphic operation using at least one of the data included in the analysis target data set.

8. The method of claim 7, wherein the classifying of each data comprises classifying data that corresponds to the sensitive information among the data included in the original data set as the encryption target data.

9. The method of claim 7, wherein the classifying of each data comprises classifying data to which the preset operation is to be applied among the data included in the original data set as the encryption target data.

10. The method of claim 7, wherein the classifying of each data comprises classifying data that corresponds to the sensitive information or data to which the preset operation is to be applied among the data included in the original data set as the encryption target data.

11. The method of claim 7, further comprising:
  decrypting the received ciphertext using the homomorphic encryption algorithm.

12. The method of claim 7, wherein the ciphertext is generated using at least one of a homomorphic operation using the encrypted data among the data included in the analysis target data set and a homomorphic operation using the encrypted data and unencrypted data among the data included in the analysis target data set.

* * * * *